(12) United States Patent
Wu (10) Patent No.: US 7,918,031 B2
(45) Date of Patent: Apr. 5, 2011

(54) THREAD RING GAUGE

(75) Inventor: San-Kuei Wu, Taichung (TW)

(73) Assignee: Chuan Hong Precision Tool Manufacturing Co., Ltd., Kaohsiung County (TW)

( * ) Notice: Subject to any disclaimer, the term of this patent is extended or adjusted under 35 U.S.C. 154(b) by 171 days.

(21) Appl. No.: 12/435,443

(22) Filed: May 5, 2009

(65) Prior Publication Data

US 2010/0281700 A1 Nov. 11, 2010

(51) Int. Cl.
   *G01B 3/34* (2006.01)
   *G01B 3/36* (2006.01)
(52) U.S. Cl. .................................. 33/199 R; 33/555.2
(58) Field of Classification Search ............. 33/199 R, 33/501.05, 501.7, 501.11–501.13, 501.19, 33/501.08, 555.1, 555.2
   See application file for complete search history.

(56) References Cited

U.S. PATENT DOCUMENTS

| | | | | |
|---|---|---|---|---|
| 170,768 A | * | 12/1875 | Reece | 408/156 |
| 1,447,448 A | | 3/1923 | Walch | |
| 1,477,534 A | * | 12/1923 | Blood | 33/501.05 |
| 2,443,904 A | * | 6/1948 | Fishman | 33/199 R |
| 2,565,025 A | * | 8/1951 | Howart et al. | 33/199 R |
| 2,588,117 A | * | 3/1952 | Howart et al. | 33/199 R |
| 2,793,443 A | * | 5/1957 | Wedin | 33/199 R |
| 2,795,857 A | * | 6/1957 | Sedlock | 33/199 R |
| 2,852,855 A | * | 9/1958 | Swanson | 33/199 R |
| 3,284,913 A | * | 11/1966 | Satava | 33/199 R |
| 2003/0194287 A1 | | 10/2003 | Hageman | |
| 2004/0154406 A1 | | 8/2004 | Alba | |
| 2007/0214664 A1 | | 9/2007 | Muradov et al. | |

\* cited by examiner

*Primary Examiner* — Amy Cohen Johnson
(74) *Attorney, Agent, or Firm* — Alan Kamrath; Kamrath & Associates PA (57) ABSTRACT

A thread ring gauge includes a body having inner and outer peripheries spaced in a radial direction. The body includes a split extending from the outer periphery through the inner periphery, separating the body into two sections respectively having first and second end faces. The first end face includes a groove extending away from the second end face in a width direction perpendicular to the radial direction. The groove extends from the outer periphery towards but spaced from the inner periphery. The groove has a bottom wall facing the second end face. An adjusting member is extended through the first and second sections and movable to adjust a width of the slit between the first and second end faces in the width direction. A gauge block is received in the groove and abuts the bottom wall of the groove and the second end face.

15 Claims, 8 Drawing Sheets

THREAD RING GAUGE

BACKGROUND OF THE INVENTION

1. Field of the Invention

The present invention relates to a thread ring gauge and, more particularly, to a thread ring gauge including a measuring hole having a reducible inner diameter.

2. Description of the Related Art

Conventional thread ring gauges include a measuring hole having an inner threading and an inner diameter for measuring sizes of screws or bolts. In one type of thread ring gauges, the inner diameter of the measuring hole is fixed such that the thread ring gauges can not be utilized after the inner threading is worn out and, thus, causes a change in the inner diameter. In another type of thread ring gauges, the inner diameter of the measuring hole is adjustable. In an example disclosed in U.S. Pat. No. 1,447,448, the female gauge includes a gauge body having a split formed between two relatively adjustable end sections. The female gauge includes an interior gauge surface adapted to contact with parts to be gauged. Two aligned screws are mounted in aligned apertures in the end sections. One or both of the screws can be rotated to adjust the split.

In use, the inner diameter of the interior gauge surface of the female gauge is calibrated to be equal to a nominal size, and the split is filled with wax to indicate that the female gauge is of the nominal size. The wax cracks when the inner threading becomes worn. In this case, the wax cracks, and the female gauge must be recalibrated to the nominal size. However, the wax could crack due to other reasons including, but not limited to, impact to the female gauge or a change in temperature. Recalibration is troublesome, for the precision tolerance is only about 8μ.

Thus, a need exists for a thread ring gauge that can be easily calibrated while having a longer service life to reduce costs.

SUMMARY OF THE INVENTION

The primary objective of the present invention is to provide a thread ring gauge having an inner diameter that can be easily calibrated.

Another objective of the present invention is to provide a thread ring gauge having an inner diameter that can be easily fixed to a nominal size.

A further objective of the present invention is to provide a thread ring gauge with a longer service life to reduce costs.

Still another objective of the present invention is to provide a thread ring gauge that can avoid undesired shift between two ends in an axial direction of the thread ring gauge.

The present invention solves this need and other problems and fulfills the above objectives in the field of thread ring gauges by providing, in a preferred aspect, a thread ring gauge including a body having inner and outer peripheries spaced in a radial direction. The inner periphery has threading. The body includes a split extending from the outer periphery through the inner periphery in the radial direction, separating the body into first and second sections respectively having first and second end faces facing each other. The split is formed between the first and second end faces. The first end face includes a first hole extending in a width direction perpendicular to the radial direction. The first hole is interposed between and spaced from the inner and outer peripheries in the radial direction. The second end face includes a second hole extending in the width direction and coaxial with the first hole. At least one of the first and second holes extends to the outer periphery. The first end face includes a first groove extending away from the second end face in the width direction. The first groove extends from the outer periphery towards but spaced from the inner periphery in the radial direction. The first groove has a bottom wall facing the second end face. A first adjusting member is received in the first and second holes. The first adjusting member is movable to adjust a width of the slit between the first and second end faces in the width direction. A first gauge block is received in the first groove and abuts the bottom wall of the first groove and the second end face.

Preferably, the second end face includes a second groove extending away from the first end face in the width direction. The second groove extends from the outer periphery towards but spaced from the inner periphery in the radial direction. The second groove has a bottom wall facing the first end face. The first gauge block is received in the first and second grooves and abuts the bottom walls of the first and second grooves.

In a preferred embodiment, the bottom walls of the first and second grooves are arcuate, and the first gauge block is cylindrical and has circular cross sections. A second gauge block has circular cross sections with a diameter smaller than that of the circular cross sections of the first gauge block. The first gauge block is replaced with the second gauge block when the threading of the inner periphery becomes worn, and the second gauge block abuts the bottom walls of the first and second grooves.

In another preferred embodiment, the bottom walls of the first and second grooves define a conic hole having increasing diameters toward the outer periphery. The first gauge block includes an outer periphery engaged with the bottom walls of the first and second grooves. The first gauge block includes increasing diameters toward the outer periphery in the radial direction. The first gauge block is rotatable to move in the first and second grooves in the radial direction.

In a further preferred embodiment, the first gauge block has polygonal cross sections having first and second pairs of parallel sides. A first spacing between the first pair of parallel sides is larger than a second spacing between the second pair of parallel sides. The bottom walls of the first and second grooves have a spacing in the width direction the same as the first spacing between the first pair of parallel sides.

In still another embodiment, the first gauge block further includes a third pair of parallel sides. The third pair of parallel sides has a spacing smaller than the first spacing between the first pair of parallel sides and different from the second spacing between the second pair of parallel sides.

In a preferred embodiment, the first end face further includes a third hole extending in the width direction. The third hole is interposed between and spaced from the inner and outer peripheries in the radial direction. The second end face includes a fourth hole extending in the width direction and coaxial with the third hole. At least one of the third and fourth holes extends to the outer periphery. A second adjusting member is received in the third and fourth holes and movable to adjust the width of the slit in the width direction.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "inner", "outer", "end", "portion", "section", "axial", "radial", "spacing", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A thread ring gauge of a first embodiment according to the preferred teachings of the present invention is shown in FIGS. 1-6. The thread ring gauge includes a body 1, an adjusting member 2, and a plurality of gauge blocks 4a. The body 1 includes inner and outer peripheries 13 and 14 spaced in a radial direction. The inner periphery 13 defines a measuring hole and has threading to be in contact with an object to be gauged by the thread ring gauge. The body 1 includes a split 10 extending from the outer periphery 14 through the inner periphery 13 in the radial direction, separating the body 10 into first and second sections 11 and 12 respectively having first and second end faces 24 and 26 facing each other. The split 10 is formed between the first and second end faces 24 and 26. Thus, the split 10 has a width P between the first and second end faces 24 and 26 in the width direction. The first end face 24 includes a first hole 15 extending in a width direction perpendicular to the radial direction. The first hole 15 is interposed between and spaced from the inner and outer peripheries 13 and 14 in the radial direction. The second end face 26 includes a second hole 16 extending in the width direction and coaxial with the first hole 15. The first hole 15 is a blind screw hole, and the second hole 16 is a through-hole extending to the outer periphery 14. However, the first hole 15 can be a through- hole, and the second hole 16 can be a blind hole. The body 1 further includes first and second sides 27 and 28 extending between the inner and outer peripheries 13 and 14. The first and second sides 27 and 28 are spaced in an axial direction perpendicular to the radial and width directions. The body 1 further includes two gaps 17 extending from the inner periphery 13 towards but spaced from the outer periphery 14. Each gap 17 extends from the first side 27 through the second side 28 of the body 1 in the axial direction. The gaps 17 allow easy movement for reducing the width P of the slit 10 between the first and second end faces 24 and 26. However, only one or more than two gaps 17 can be formed in the body 1.

Figure 1:
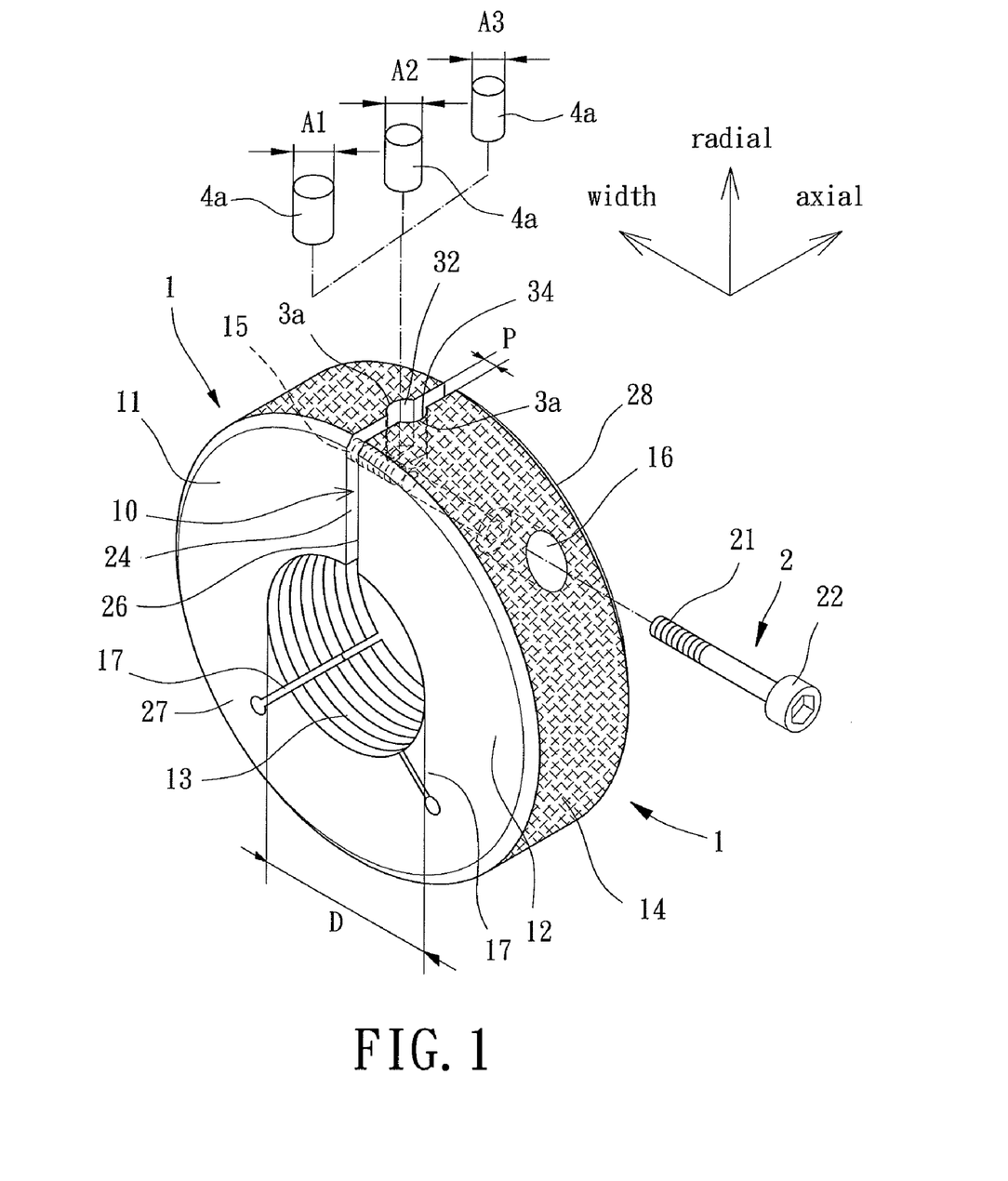
FIG. 1 shows an exploded, perspective view of a thread ring gauge of a first embodiment according to the preferred teachings of the present invention.
Figure 2:
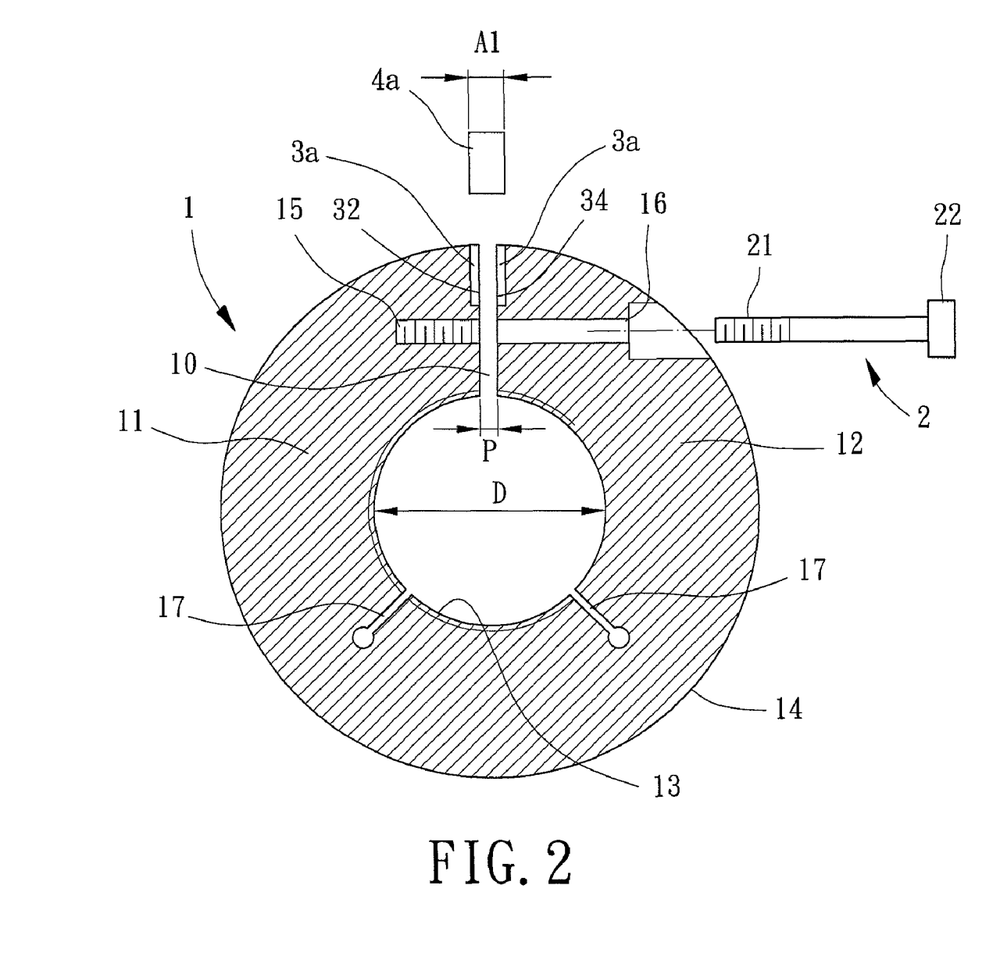
FIG. 2 shows an exploded, cross sectional view of the thread ring gauge of FIG. 1.
Figure 3:
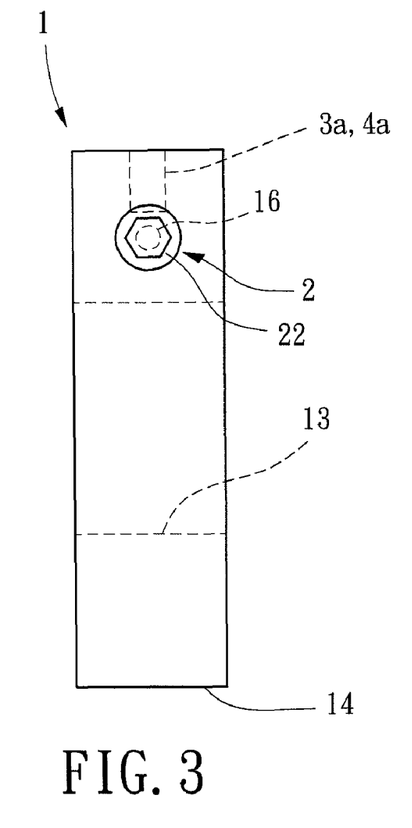
FIG. 3 shows a right side view of the thread ring gauge of FIG. 2.

With reference to FIGS. 1-3, the adjusting member 2 is extended through the second hole 16 and engaged with the first hole 15. Specifically, the adjusting member 2 includes a threaded engaging end 21 threadedly engaged with the first hole 15 in the form of a screw hole. Furthermore, the adjusting member 2 includes an operative end 22 that can be engaged with a tool for rotating the adjusting member 2 to adjust the width P of the slit 10 between the first and second end faces 24 and 26 of the body 1.

With reference to FIGS. 1-3, the first end face 24 includes a first groove 3a extending away from the second end face 26 in the width direction. The first groove 3a extends from the outer periphery 14 towards but spaced from the inner periphery 13 in the radial direction. The first groove 3a has a bottom wall 32 facing the second end face 26. The second end face 26 includes a second groove 3a extending away from the first end face 24 in the width direction. The second groove 3a extends from the outer periphery 14 towards but spaced from the inner periphery 13 in the radial direction. The second groove 3a has a bottom wall 34 facing the first end face 24. The bottom walls 32 and 34 of the first and second grooves 3a are arcuate. A substantially cylindrical groove is defined by the first and second grooves 3a.

Figure 4:
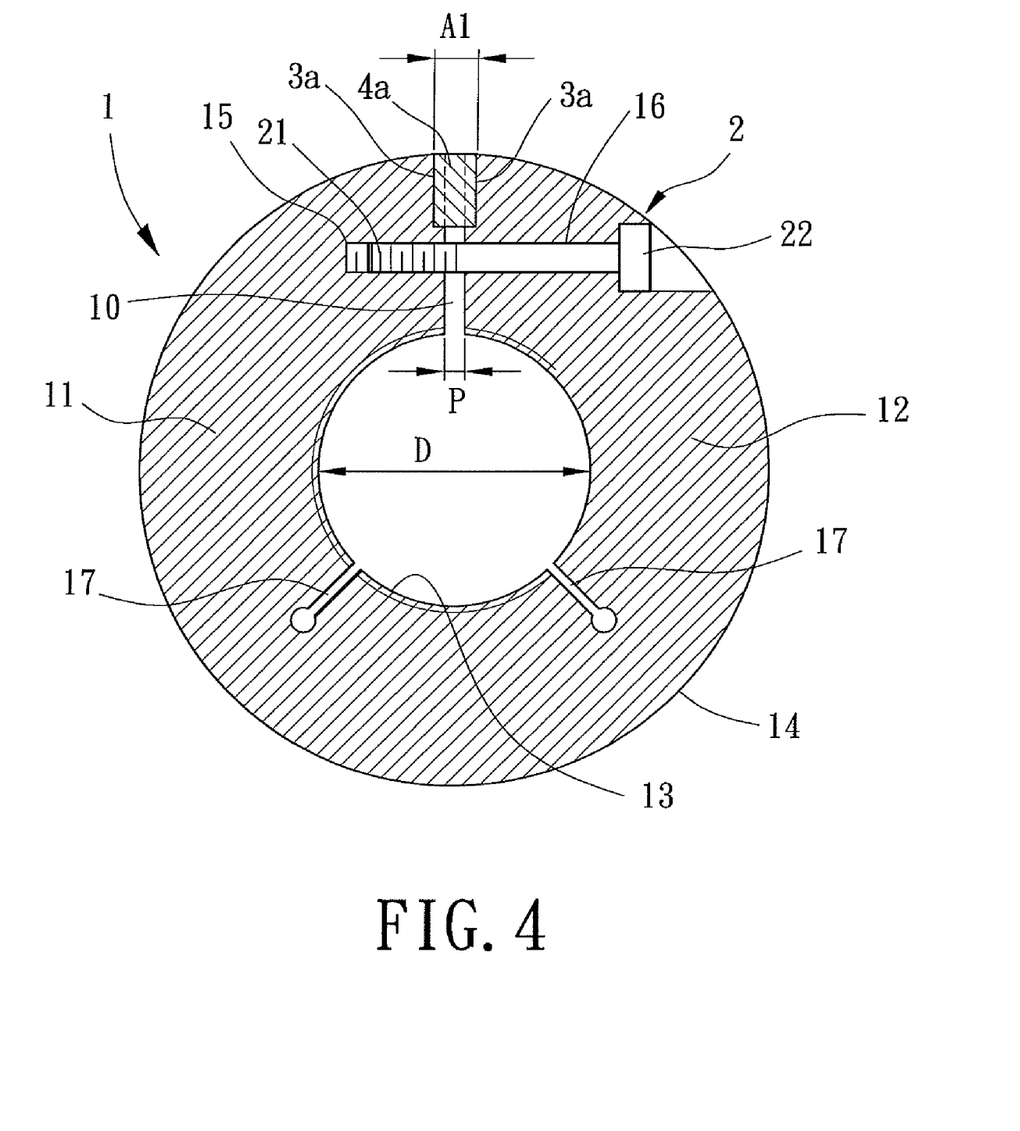
FIG. 4 shows a cross sectional view of the thread ring gauge of FIG. 1 in use.

With reference to FIGS. 3-4, the thread ring gauge further includes first, second, and third gauge blocks 4a. Specifically, each of the first, second, and third gauge blocks 4a is cylindrical and has circular cross sections. Furthermore, the diameter A1 of the circular cross sections of the first gauge block 4a is larger than the diameter A2 of the circular cross sections of the second gauge block 4a, which, in turn, is larger than the diameter A3 of the circular cross sections of the third gauge block 4a. The diameters A1-A3 can be varied according to needs. As an example, the difference between the diameters A1 and A2 can be equal to that between the diameters A2 and A3. The bottom walls 32 and 34 of the first and second grooves 3a have a spacing the same as the diameter A1 of the first gauge block 4a.

In use, the first gauge block 4a having the diameter A1 is inserted into the first and second grooves 3a. The threaded engaging end 21 of the adjusting member 2 is extend through the second hole 16 into the first hole 15 and then rotated to reduce the width P of the slit 10 until the first gauge block 4a is securely held and not rotatable in the first and second grooves 3a with the first gauge block 4a abutting the bottom walls 32 and 34 of the first and second grooves 3a. At this time, the inner periphery 13 has a nominal diameter D. An object such as a screw or bolt to be gauged can be threadedly engaged with the threading of the inner periphery 13 of the thread ring gauge. If the object matches with the threading of the inner periphery 13, the diameter of the object is equal to the nominal diameter D of the inner periphery 13.

Figure 5:
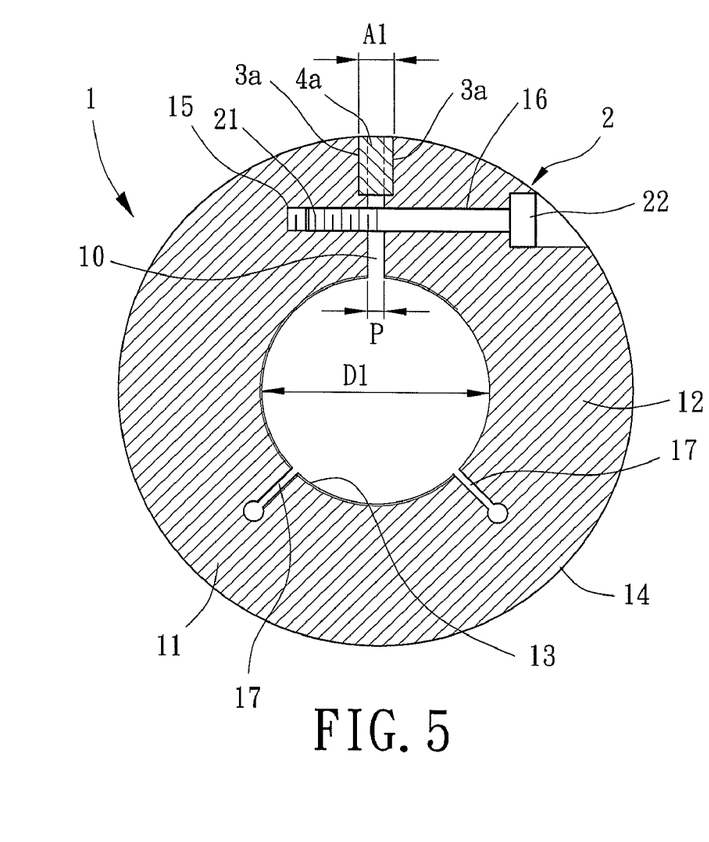
FIG. 5 is a cross sectional view similar to FIG. 4, illustrating wear of the thread ring gauge of FIG. 1.
Figure 6:
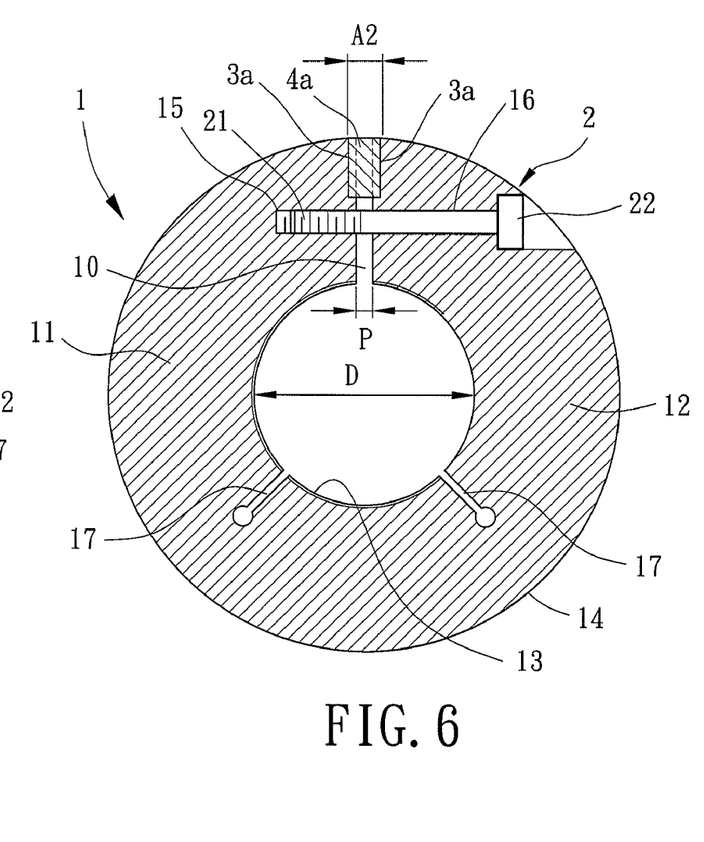
FIG. 6 shows a cross sectional view of the thread ring gauge of FIG. 1 using a gauge block of a smaller size.

With reference to FIG. 5, when the threading of the inner periphery 13 becomes worn after the thread ring gauge has been utilized for a period of time such that the inner diameter of the inner periphery 13 becomes larger than the nominal diameter D (see diameter D1), the adjusting member 2 is rotated to increase the width P of the slit 10 so that the first gauge block 4a can be removed and replaced with the second gauge block 4a with diameter A2 smaller than diameter A1. The adjusting member 2 is rotated to reduce the width P of the slit 10 until the second gauge block 4a is securely held in the first and second grooves 3a. Thus, as shown in FIG. 6, the inner diameter D1 of the inner periphery 13 of the body 10 is reduced to the nominal diameter D. The thread ring gauge can be utilized for another period of time until the threading of the inner periphery 13 becomes further worn. However, the second gauge block 4a can be replaced with the third gauge block 4a having the diameter A3 smaller than diameter A2 to extend the service life of the thread ring gauge. Operation of the thread ring gauge according to the preferred teachings of the present invention is easy and convenient without using wax while extending the service life of the thread ring gauge. Three or four replacements of the gauging blocks 4a are allowed by using more gauge blocks 4a. It can be appreciated that undesired shifting between the first and second sections 11 and 12 in the axial direction is avoided after the gauge block 4a is securely held in the first and second grooves 3a.

Figure 7:
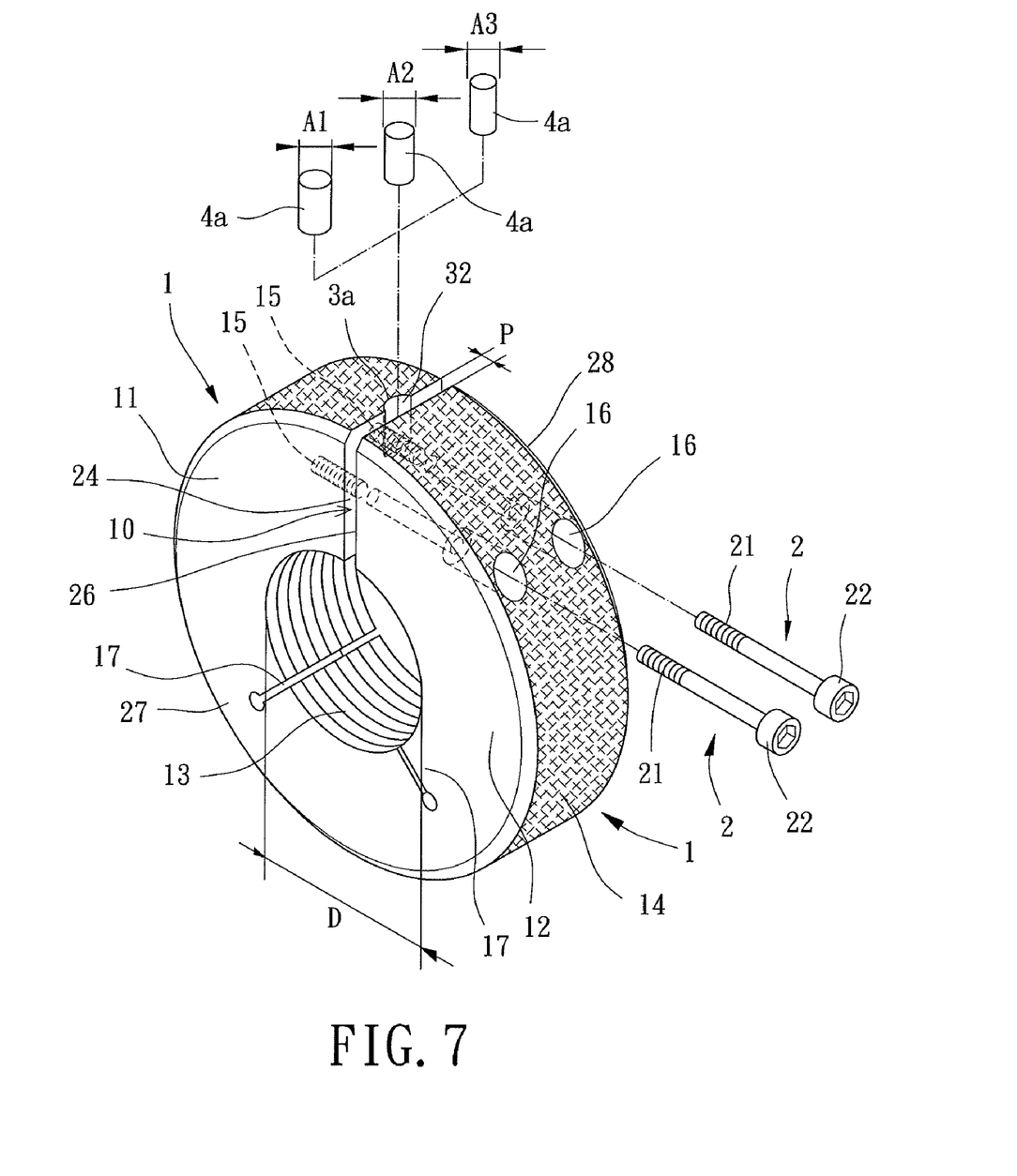
FIG. 7 shows an exploded, perspective view of a thread ring gauge of a second embodiment according to the preferred teachings of the present invention.

FIG. 7 shows a thread ring gauge of a second embodiment according to the preferred teachings of the present invention. In this embodiment, the second end face 26 does not include the second groove 3a. Furthermore, the first end face 24 includes an additional first hole 15. Further, the second end face 26 includes an additional second hole 16 coaxial with the additional first hole 15. Further, an additional adjusting member 2 extends through the additional second hole 16 into the additional first hole 15. The first groove 3a is interposed between and spaced from the first holes 15 in the axial direction. Thus, the gauge block 4a can be securely held in the first groove 3a and sandwiched between the bottom wall 32 of the first groove 3a and the second end face 26, avoiding undesired shifting between the first and second sections 11 and 12 in the axial direction.

Figure 8:
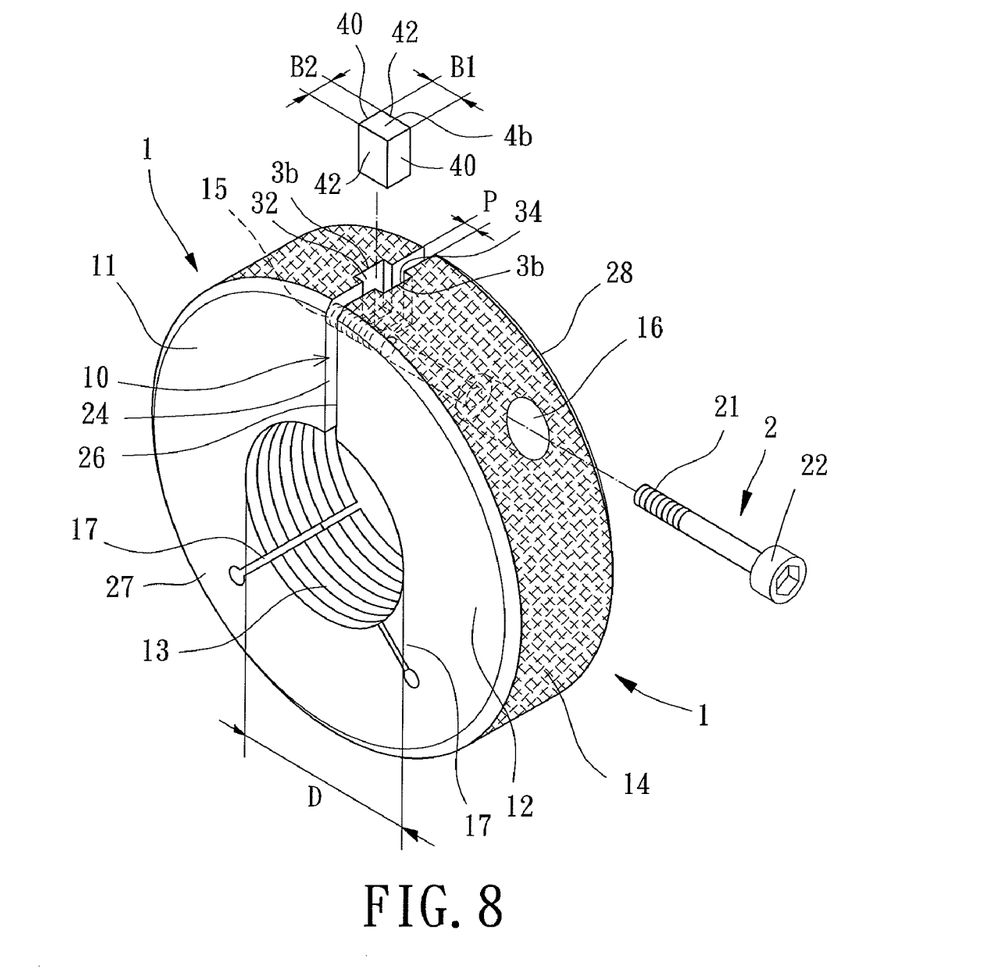
FIG. 8 shows an exploded, perspective view of a thread ring gauge of a third embodiment according to the preferred teachings of the present invention.
Figure 9:
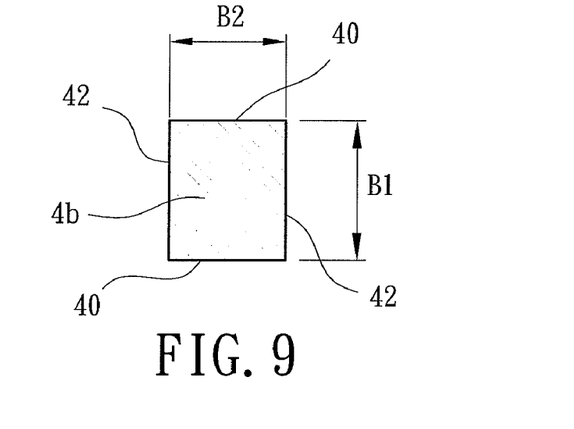
FIG. 9 shows a cross sectional view of a gauge block of FIG. 8.

FIGS. 8 and 9 show a thread ring gauge of a third embodiment according to the preferred teachings of the present invention. In this embodiment, the thread ring gauge includes a gauge block 4b including rectangular cross sections having first and second pairs of parallel sides 40 and 42. A spacing B2 between the second pair of parallel sides 42 is smaller than a spacing B1 between the first pair of parallel sides 40. The bottom walls 32 and 34 of then first and second grooves 3b have a spacing in the width direction the same as the spacing B1 between the first pair of parallel sides 40. When in use, the first pair of parallel sides 40 of the gauge block 4b is securely sandwiched between the bottom walls 32 and 34 of the first and second grooves 3b so that the inner periphery 13 of the body 1 has the nominal diameter D. When the threading of the inner periphery 13 becomes worn, the gauge block 4b can be removed and then reinserted into the first and second grooves 3b with the second pair of parallel sides 42 of the gauge block 4b securely sandwiched between the bottom walls 32 and 34 of the first and second groove 3b. The inner diameter of the inner periphery 13 of the body 1 can, thus, be reduced back to the nominal diameter D, prolonging the service life of the thread ring gauge.

Figure 10:
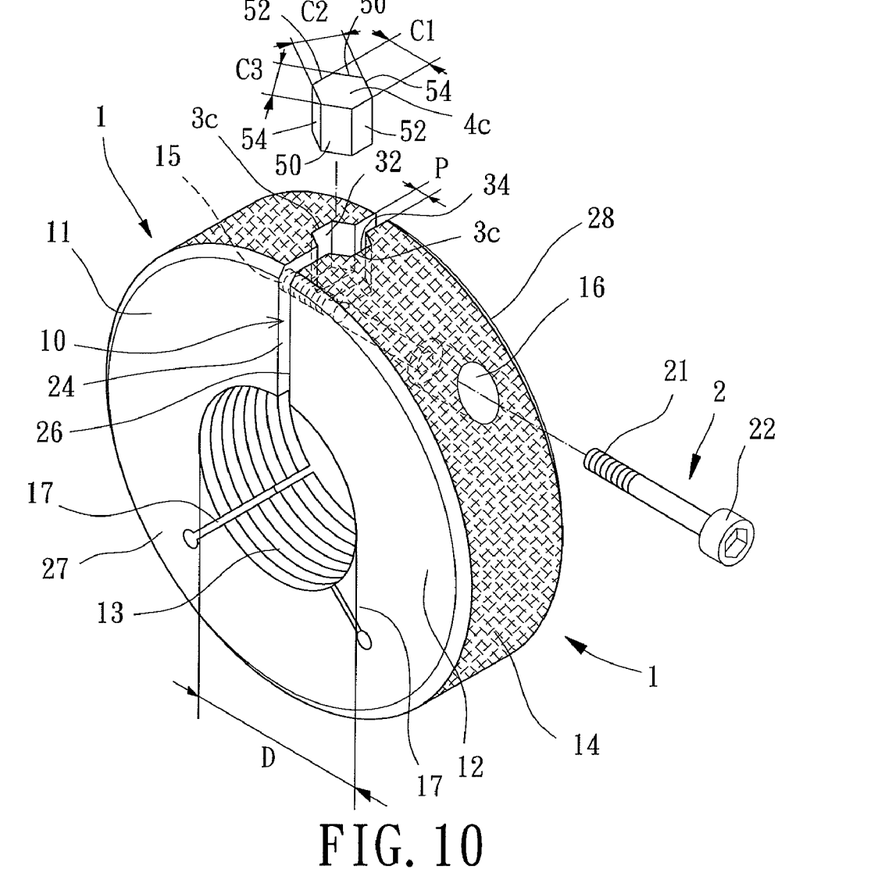
FIG. 10 shows an exploded, perspective view of a thread ring gauge of a fourth embodiment according to the preferred teachings of the present invention.
Figure 11:
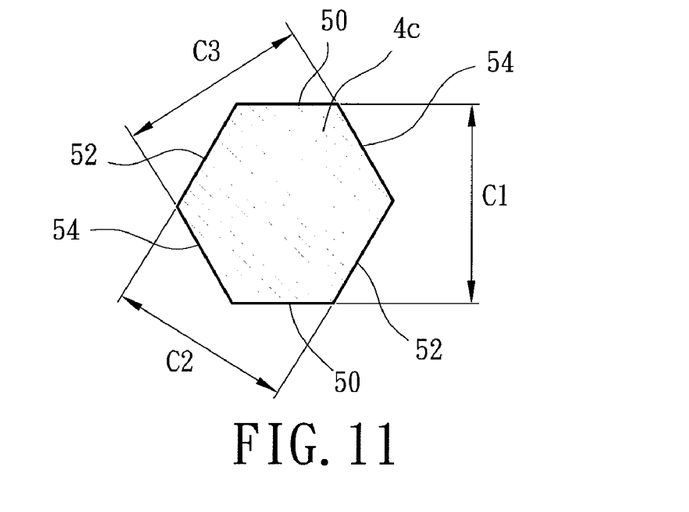
FIG. 11 shows a cross sectional view of a gauge block of FIG. 10.

FIGS. 10 and 11 show a thread ring gauge of a fourth embodiment according to the preferred teachings of the present invention. In this embodiment, the thread ring gauge includes a gauge block 4c including hexagonal cross sections having first, second, and third pairs of parallel sides 50, 52, and 54. A spacing C1 between the first pair of parallel sides 50 is larger than a spacing C2 between the second pair of parallel sides 52, which, in turn, is larger than a spacing C3 between the third pair of parallel sides 54. The bottom walls 32 and 34 of first and second grooves 3c have a spacing in the width direction the same as the spacing C1 between the first pair of parallel sides 50. The difference between the spacings C1 and C2 can be the same as or different from that between the spacings C2 and C3. The first and second grooves 3c together define a compartment having hexagonal cross sections similar to those of the gauge block 4c. When in use, the first pair of parallel sides 50 of the gauge block 4c is securely sandwiched between the bottom walls 32 and 34 of the first and second grooves 3c so that the inner periphery 13 of the body 1 has the nominal diameter D. When the threading of the inner periphery 13 becomes worn, the gauge block 4c can be removed and then reinserted into the first and second grooves 3c with the second pair of parallel sides 52 of the gauge block 4c securely sandwiched between the bottom walls 32 and 34 of the first and second groove 3c. The inner diameter of the inner periphery 13 of the body 1 can, thus, be reduced back to the nominal diameter D, prolonging the service life of the thread ring gauge. Furthermore, when the threading of the inner periphery 13 becomes further worn, the gauge block 4c can be removed and then reinserted into the first and second grooves 3c with the third pair of parallel sides 54 of the gauge block 4c securely sandwiched between the bottom walls 32 and 34 of the first and second groove 3c. The inner diameter of the inner periphery 13 of the body 1 can, thus, be reduced back to the nominal diameter D, further prolonging the service life of the thread ring gauge.

Figure 12:
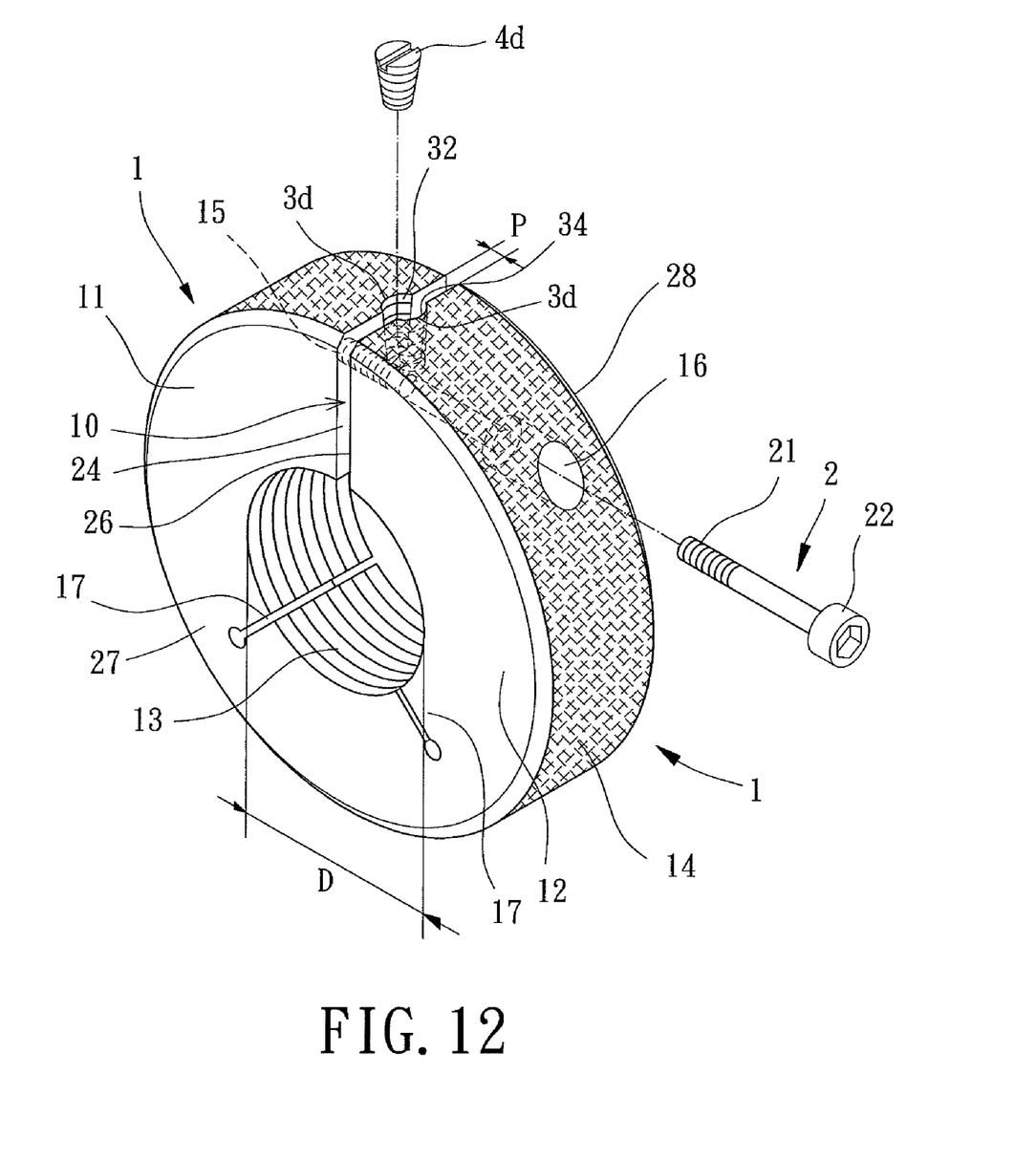
FIG. 12 shows an exploded, perspective view of a thread ring gauge of a fifth embodiment according to the preferred teachings of the present invention.

FIG. 12 shows a threaded ring gauge of a fifth embodiment according to the preferred teachings of the present invention. Specifically, the bottom walls 32 and 34 of first and second grooves 3d in this embodiment are threaded and define a conic hole having increasing diameters toward the outer periphery 14. The threaded ring gauge includes a gauge block 4d having a threaded outer periphery threadedly engaged with the threaded bottom walls 32 and 34 of the first and second grooves 3d. The gauge block 4d includes increasing diameters toward the outer periphery 14 in the radial direction. The gauge block 4d includes a slot in an outer end face thereof and can be driven by a tool such as a screwdriver. Specifically, when the threading of the inner periphery 13 becomes worn, the gauge block 4d can be rotated in the first and second grooves 3d and, thus, move in the radial direction. Furthermore, the adjusting member 2 can be rotated until the gauge block 4d is securely clamped between the first and second bottom walls 32 and 34. Thus, the inner diameter of the inner periphery 13 of the body 1 is reduced back to the nominal diameter D.

It can be appreciated that the gauge blocks 4a having circular cross sections and the first and second grooves 3a forming a substantially cylindrical hole are preferred due to easy manufacture and processing. Furthermore, the effect of avoiding undesired shifting between the first and second sections 11 and 12 can be enhanced when the second end face 26 includes the second groove 3a.

The thread ring gauges according to the preferred teachings of the present invention have long service lives by utilizing gauge blocks 4a, 4b, 4c, and 4d sandwiched between the grooves 3a, 3b, 3c, and 3d. Furthermore, undesired shift in the axial direction between the first and second sections 11 and 12 can be avoided when the gauge blocks 4a, 4b, 4c, and 4d have cross sections the same as or similar to those of the grooves 3a, 3b, 3c, and 3d. Further, undesired shift in the axial direction between the first and second sections 11 and 12 can be further avoided by utilizing two adjusting members 2.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A thread ring gauge comprising:
a body including inner and outer peripheries spaced in a radial direction, with the inner periphery having threading, with the body including a split extending from the outer periphery through the inner periphery in the radial direction, separating the body into first and second sections respectively having first and second end faces facing each other, with the split formed between the first and second end faces, with the first end face including a first hole extending in a width direction perpendicular to the radial direction, with the first hole interposed between and spaced from the inner and outer peripheries in the radial direction, with the second end face including a second hole extending in the width direction and coaxial with the first hole, with at least one of the first and second holes extending to the outer periphery, with the first end face including a first groove extending away from the second end face in the width direction, with the first groove extending from the outer periphery towards but spaced from the inner periphery in the radial direction, with the first groove having a bottom wall facing the second end face, with the second end face including a second groove extending away from the first end face in the width direction, with the second groove extending from the outer periphery towards but spaced from the inner periphery in the radial direction, with the second groove having a bottom wall facing the first end face;
a first adjusting member received in the first and second holes, with the first adjusting member being movable to adjust a width of the slit between the first and second end faces in the width direction;
a first gauge block received in the first and second grooves and abutting the bottom walls of the first and second grooves, with the bottom walls of the first and second grooves being arcuate, and with the first gauge block being cylindrical and having circular cross sections; and
a second gauge block having circular cross sections with a diameter smaller than that of the circular cross sections of the first gauge block, with the first gauge block being replaced with the second gauge block when the threading of the inner periphery becomes worn, and with the second gauge block abutting the bottom walls of the first and second grooves.

2. The thread ring gauge as claimed in claim 1, with the first hole being a screw hole, with the first adjusting member including a first, threaded end threadedly engaged with the screw hole, and with the first adjusting member further including a second end adapted to be driven to adjust the width of the slit.

3. The thread ring gauge as claimed in claim 1, with the body further including first and second sides extending between the inner and outer peripheries, with the first and second sides spaced in an axial direction perpendicular to the radial and width directions, with the body further including at least one gap extending from the inner periphery towards but spaced from the outer periphery, and with said at least one gap extending from the first side through the second side of the body in the axial direction.

4. A thread ring gauge comprising:
a body including inner and outer peripheries spaced in a radial direction, with the inner periphery having threading, with the body including a split extending from the outer periphery through the inner periphery in the radial direction, separating the body into first and second sections respectively having first and second end faces facing each other, with the split formed between the first and second end faces, with the first end face including a first hole extending in a width direction perpendicular to the radial direction, with the first hole interposed between and spaced from the inner and outer peripheries in the radial direction, with the second end face including a second hole extending in the width direction and coaxial with the first hole, with at least one of the first and second holes extending to the outer periphery, with the first end face including a first groove extending away from the second end face in the width direction, with the first groove extending from the outer periphery towards but spaced from the inner periphery in the radial direction, with the first groove having a bottom wall facing the second end face, with the second end face including a second groove extending away from the first end face in the width direction, with the second groove extending from the outer periphery towards but spaced from the inner periphery in the radial direction, with the second groove having a bottom wall facing the first end face;
a first adjusting member received in the first and second holes, with the first adjusting member being movable to adjust a width of the slit between the first and second end faces in the width direction; and
a first gauge block received in the first and second grooves and abutting the bottom walls of the first and second grooves, with the bottom walls of the first and second grooves being threaded and defining a conic hole having increasing diameters toward the outer periphery, with the first gauge block including a threaded outer periphery threadedly engaged with the bottom walls of the first and second grooves, with the first gauge block including increasing diameters toward the outer periphery in the radial direction, and with the first gauge block being rotatable to move in the first and second grooves in the radial direction.

5. The thread ring gauge as claimed in claim 4, with the first hole being a screw hole, with the first adjusting member including a first, threaded end threadedly engaged with the screw hole, and with the first adjusting member further including a second end adapted to be driven to adjust the width of the slit.

6. The thread ring gauge as claimed in claim 4, with the body further including first and second sides extending between the inner and outer peripheries, with the first and second sides spaced in an axial direction perpendicular to the radial and width directions, with the body further including at least one gap extending from the inner periphery towards but spaced from the outer periphery, and with said at least one gap extending from the first side through the second side of the body in the axial direction.

7. A thread ring gauge comprising:
a body including inner and outer peripheries spaced in a radial direction, with the inner periphery having threading, with the body including a split extending from the outer periphery through the inner periphery in the radial direction, separating the body into first and second sections respectively having first and second end faces facing each other, with the split formed between the first and second end faces, with the first end face including a first hole extending in a width direction perpendicular to the radial direction, with the first hole interposed between and spaced from the inner and outer peripheries in the radial direction, with the second end face including a second hole extending in the width direction and coaxial with the first hole, with at least one of the first and second holes extending to the outer periphery, with the first end face including a first groove extending away from the second end face in the width direction, with the first groove extending from the outer periphery towards but spaced from the inner periphery in the radial direction, with the first groove having a bottom wall facing the second end face, with the second end face including a second groove extending away from the first end face in the width direction, with the second groove extending from the outer periphery towards but spaced from the inner periphery in the radial direction, with the second groove having a bottom wall facing the first end face;
a first adjusting member received in the first and second holes, with the first adjusting member being movable to adjust a width of the slit between the first and second end faces in the width direction; and
a first gauge block received in the first and second grooves and abutting the bottom walls of the first and second grooves, with the first gauge block having polygonal cross sections having first and second pairs of parallel sides, with a first spacing between the first pair of parallel sides being larger than a second spacing between the second pair of parallel sides, with the bottom walls of the first and second grooves having a third spacing in the width direction the same as the first spacing between the first pair of parallel sides.

8. The thread ring gauge as claimed in claim 7, with the first gauge block further including a third pair of parallel sides, with the third pair of parallel sides having a fourth spacing smaller than the first spacing between the first pair of parallel sides and different from the second spacing between the second pair of parallel sides.

9. The thread ring gauge as claimed in claim 7, with the first hole being a screw hole, with the first adjusting member including a first, threaded end threadedly engaged with the screw hole, and with the first adjusting member further including a second end adapted to be driven to adjust the width of the slit.

10. The thread ring gauge as claimed in claim 7, with the body further including first and second sides extending between the inner and outer peripheries, with the first and second sides spaced in an axial direction perpendicular to the radial and width directions, with the body further including at least one gap extending from the inner periphery towards but spaced from the outer periphery, and with said at least one gap extending from the first side through the second side of the body in the axial direction.

11. A thread ring gauge comprising:
a body including inner and outer peripheries spaced in a radial direction, with the inner periphery having threading, with the body including a split extending from the outer periphery through the inner periphery in the radial direction, separating the body into first and second sections respectively having first and second end faces facing each other, with the split formed between the first and second end faces, with the first end face including a first hole extending in a width direction perpendicular to the radial direction, with the first hole interposed between and spaced from the inner and outer peripheries in the radial direction, with the second end face including a second hole extending in the width direction and coaxial with the first hole, with at least one of the first and second holes extending to the outer periphery, with the first end face including a first groove extending away from the second end face in the width direction, with the first groove extending from the outer periphery towards but spaced from the inner periphery in the radial direction, with the first groove having a bottom wall facing the second end face;
a first adjusting member received in the first and second holes, with the first adjusting member being movable to adjust a width of the slit between the first and second end faces in the width direction; and
a first gauge block received in the first groove and abutting the bottom wall of the first groove and the second end face, with the first end face further including a third hole extending in the width direction, with the third hole interposed between and spaced from the inner and outer peripheries in the radial direction, with the second end face including a fourth hole extending in the width direction and coaxial with the third hole, with at least one of the third and fourth holes extending to the outer periphery, with the thread ring gauge further comprising:
a second adjusting member received in the third and fourth holes, with the second adjusting member being movable to adjust the width of the slit in the width direction.

12. The thread ring gauge as claimed in claim 11, with the second end face including a second groove extending away from the first end face in the width direction, with the second groove extending from the outer periphery towards but spaced from the inner periphery in the radial direction, with the second groove having a bottom wall facing the first end face, and with the first gauge block received in the first and second grooves and abutting the bottom walls of the first and second grooves.

13. The thread ring gauge as claimed in claim 12, with the bottom walls of the first and second grooves being arcuate, and with the first gauge block being cylindrical and having circular cross sections.

14. The thread ring gauge as claimed in claim 11, with the third hole being a screw hole, with the second adjusting member including a first, threaded end threadedly engaged with the screw hole, and with the second adjusting member further including a second end adapted to be driven to adjust the width of the slit.

15. The thread ring gauge as claimed in claim 11, with the body further including first and second sides extending between the inner and outer peripheries, with the first and second sides spaced in an axial direction perpendicular to the radial and width directions, with the body further including at least one gap extending from the inner periphery towards but spaced from the outer periphery, and with said at least one gap extending from the first side through the second side of the body in the axial direction.

* * * * *